(12) United States Patent
Liu et al.

(10) Patent No.: US 11,305,577 B2
(45) Date of Patent: Apr. 19, 2022

(54) LIGHTWEIGHT WHEELS AND AUTOMOBILE

(71) Applicant: CITIC Dicastal CO., LTD., Hebei (CN)

(72) Inventors: Weidong Liu, Qinhuangdao (CN); Dexi Du, Qinhuangdao (CN); Shaoqian Wang, Qinhuangdao (CN); Minglei Li, Qinhuangdao (CN); Xiaomian Sun, Qinhuangdao (CN); Shiwen Xu, Qinhuangdao (CN)

(73) Assignee: CITIC DICASTAL CO., LTD., Hebei (CN)

( * ) Notice: Subject to any disclaimer, the term of this patent is extended or adjusted under 35 U.S.C. 154(b) by 218 days.

(21) Appl. No.: 16/693,927

(22) Filed: Nov. 25, 2019

(65) Prior Publication Data

US 2020/0406670 A1  Dec. 31, 2020

(30) Foreign Application Priority Data

Jun. 27, 2019  (CN) .......................... 201910565636.3

(51) Int. Cl.
*B60B 1/04* (2006.01)
*B60B 1/02* (2006.01)

(52) U.S. Cl.
CPC ............ *B60B 1/044* (2013.01); *B60B 1/0223* (2013.01); *B60B 1/0261* (2013.01); *B60B 1/042* (2013.01);
(Continued)

(58) Field of Classification Search
CPC ........... B60B 1/04; B60B 1/041; B60B 1/042; B60B 1/043; B60B 1/044; B60B 1/045;
(Continued)

(56) References Cited

U.S. PATENT DOCUMENTS 249,166 A * 11/1881 Fielding et al. ........ B60B 1/042
  301/59
430,687 A *  6/1890 Reinhold ................ B60B 1/042
  301/59
(Continued)

FOREIGN PATENT DOCUMENTS

| EP | 1310383 A2 | 5/2003 | |
|----|------------|--------|-|
| FR | 2745232 A1 * | 8/1997 | ............ B60B 1/041 |
| WO | 2011140826 A1 | 11/2011 | |

OTHER PUBLICATIONS

European Search Report in the European application No. 19219873. 7, dated May 18, 2020, 7 pgs.

*Primary Examiner* — Kip T Kotter
(74) *Attorney, Agent, or Firm* — Cooper Legal Group, LLC (57) ABSTRACT

A lightweight wheel is provided, which includes a flange, a plurality of titanium alloy spokes and a carbon fiber rim, herein the flange is positioned at a middle part of the carbon fiber rim, the plurality of titanium alloy spokes are connected between the flange and the carbon fiber rim, and the plurality of titanium alloy spokes are uniformly distributed in pairs along the circumference; and one end of each of the titanium alloy spokes combined in pairs is fixed on the flange in a centralized mode, and another end is fixed separately at the carbon fiber rim, making the titanium alloy spokes combined in pairs a fan shape. An automobile is also provided.

8 Claims, 8 Drawing Sheets

(52) U.S. Cl.
CPC ........ *B60B 1/048* (2013.01); *B60B 2360/102* (2013.01); *B60B 2360/108* (2013.01); *B60B 2360/3416* (2013.01); *B60B 2900/111* (2013.01)

(58) Field of Classification Search
CPC ....... B60B 1/046; B60B 1/047; B60B 1/0223; B60B 1/0261; B60B 1/006; B60B 5/02; B60B 2360/102; B60B 2360/108; B60B 2360/3416; B60B 2900/111
See application file for complete search history.

(56) References Cited

U.S. PATENT DOCUMENTS

| | | | | |
|---|---|---|---|---|
| 520,845 | A * | 6/1894 | Fay | B60B 1/042 |
| | | | | 301/55 |
| 556,124 | A * | 3/1896 | Wolff | B60B 1/041 |
| | | | | 301/58 |
| 2001/0054840 | A1 * | 12/2001 | Schlanger | B60B 1/0284 |
| | | | | 301/59 |
| 2003/0085610 | A1 | 5/2003 | Addink | |
| 2004/0130204 | A1 | 7/2004 | Schlanger | |
| 2004/0155518 | A1 | 8/2004 | Schlanger | |
| 2010/0264722 | A1 * | 10/2010 | Teixeira, IV | B60B 21/062 |
| | | | | 301/58 |

* cited by examiner

LIGHTWEIGHT WHEELS AND AUTOMOBILE

CROSS-REFERENCE TO RELATED APPLICATIONS

The present application claims benefit of Chinese Patent Application No. 201910565636.3, filed on Jun. 27, 2019, the contents of which are hereby incorporated by reference in their entirety.

BACKGROUND

Wheels are important outer parts and safety parts of automobiles. Therefore, the design and manufacture of wheels must meet the requirements of safety and use. Meanwhile, in order to reduce the fuel consumption of automobiles and improve the braking performance, the light weight of a wheel hub is very important and the effect is also obvious. Balancing the light weight, structural strength and heat dissipation performance of wheels and designing a wheel with high strength, good heat dissipation and light weight have always been the common pursuit of wheel design and production. In addition, for an existing one-piece wheel, when one spoke is broken, the whole wheel has to be scrapped oftentimes, resulting in high replacement and maintenance costs. The firmness, safety and strength of a split type wheel hub are the problems facing design and production.

SUMMARY

The disclosure relates to the technical field of wheel structures, in particular to lightweight wheels which combines titanium alloy spokes and a carbon fiber rim, and an automobile.

The embodiment of the disclosure provides lightweight wheels and an automobile, which can solve the problems in the related art. A flange, a plurality of titanium alloy spokes and a carbon fiber rim are designed in a split mode, the plurality of titanium alloy spokes are adopted to connect and fix the flange and the carbon fiber rim, and the titanium alloy spokes ensure the structural strength of the wheel; meanwhile, the weight of the wheel is reduced, the heat dissipation effect is good, the service life of a tire is prolonged, and the running safety of the automobile is effectively guaranteed; and the carbon fiber rim ensures the structural strength of the wheel and further reduces the weight of the wheel, so that under the same power, the braking performance of the wheel is more sensitive compared with that of a pure aluminum alloy hub, the damping effect is better, and the oil consumption is lower.

In order to achieve the above purpose, the disclosure provides the following technical solution:

In a first aspect of present disclosure, a lightweight wheel is provided, which includes a flange, a plurality of titanium alloy spokes and a carbon fiber rim, herein the flange is positioned at a middle part of the carbon fiber rim, the plurality of titanium alloy spokes are connected between the flange and the carbon fiber rim, and the plurality of titanium alloy spokes are uniformly distributed in pairs along the circumference; and an end of each of the titanium alloy spokes combined in pairs is fixed on the flange in a centralized mode, and another end is fixed separately at the carbon fiber rim, making the titanium alloy spokes combined in pairs a fan shape. In the present embodiment, a plurality of titanium alloy spokes are adopted to connect and fix a flange and a carbon fiber rim, and the titanium alloy spokes ensure the structural strength of the wheel; meanwhile, the weight of the wheel is reduced, the heat dissipation effect is good, the service life of a tire is prolonged, and the running safety of an automobile is effectively guaranteed; the carbon fiber rim ensures the structural strength of the wheel and further reduces the weight of the wheel, so that under the same power, the braking performance of the wheel is more sensitive compared with that of a pure aluminum alloy hub, the damping effect is better, and the oil consumption is lower; and the fan-shaped structure design of the titanium alloy spokes combined in pairs ensures the structural strength of the wheel and the safety, reliability and performance stability of the wheel by means of the stability of a triangle. In addition, the lightweight wheel adopts a split design, which allows damaged parts to be replaced separately, thus greatly reducing the maintenance and replacement costs and being more beneficial to the promotion of the wheel.

In a second aspect, the embodiment of the disclosure provides a lightweight wheel, including a flange, a plurality of titanium alloy spokes, locking sleeves, steel sleeves, a connecting ring, connecting bolts and a carbon fiber rim, herein an end of each titanium alloy spoke is provided with threads, another end is bent and provided with a flat end, and each flat end is provided with a first assembly hole; the flange is positioned at a middle part of the carbon fiber rim, a side wall of the flange is provided with two layers of ring grooves with one above the other, each layer of ring groove is provided with a plurality of threaded holes uniformly distributed; a plurality of bolts are fastened in the threaded holes of each layer of ring groove and pass through the first assembly holes to mount the flat ends of the titanium alloy spokes on the ring groove; an inner side of the middle part of the carbon fiber rim is provided with a ring-shaped boss, and a plurality of second assembly holes are uniformly distributed in the ring-shaped boss; the side wall and the upper end face of the connecting ring are respectively provided with a plurality of first mounting holes and a plurality of second mounting holes which are uniformly distributed, each of the steel sleeves are mounted in the each of the plurality of the first mounting holes, an first inner hole is formed in each of the steel sleeves, and the first inner hole of each of the steel sleeves is provided with a spherical surface; the connecting bolts pass through the second mounting holes and the second assembly holes to fix the carbon fiber rim and the connecting ring; an upper side walls of each of the locking sleeves is provided with a spherical surface, the upper side wall of each of the locking sleeves are mounted in the first inner hole of each of the steel sleeves and are matched with the spherical surface of the first inner hole of each of the steel sleeves, and a second inner hole is formed in each of the locking sleeves; and the second inner hole of each of the locking sleeves is a threaded hole, and the second inner holes of each of the locking sleeves is matched with the thread at an end of each of the titanium alloy spokes to fix an end of each of the titanium alloy spokes to each of the inner holes of the locking sleeves. In the present embodiment, a connecting structure of titanium alloy spokes, a flange and a carbon fiber rim is designed; due to the fact that the flange and the titanium alloy spokes are connected through ring grooves, the titanium alloy spokes have the freedom of movement in the circumferential direction of the ring grooves, thus effectively reducing the assembly difficulty and processing cost of the titanium alloy spokes; by means of the matching of spherical surfaces of inner holes of steel sleeves and spherical surfaces of the upper side walls of locking sleeves, the locking sleeves and the titanium alloy spokes can rotate around the spherical centers of the steel sleeves within a certain range, and the structure can realize the spatial layout of the titanium alloy spokes, thereby meeting the requirements on strength, appearance and the like of the wheel; and the design of the connecting parts and the structure effectively reduces the overall weight of the wheel, ensures the structural strength and heat dissipation performance of the wheel, meets the requirement for light weight of the wheel, and has the characteristics of simple structure, convenient assembly, high safety and reliability and stable performance. In addition, when certain parts of the lightweight wheel are damaged, the damaged parts can be replaced separately, thus greatly reducing the maintenance and replacement costs and being more beneficial to the promotion of the wheel.

In some embodiments, herein each locking sleeve includes a spherical surface at an upper end and a structural surface at a lower end, the second inner hole is formed in each of the locking sleeves in a vertically through manner, and tightness of each titanium alloy spoke can be adjusted by matching a special tool for tightening with the structural surface of one locking sleeve and rotating the locking sleeve. In the present embodiment, the tightness of each titanium alloy spoke can be adjusted by matching a special tool for tightening with the structural surface of one locking sleeve and then rotating the locking sleeve, the requirement on the coaxiality of the center of the flange and a connecting ring is met, and the wheel has the characteristics of simple structure, convenient assembly, high safety and reliability and stable performance.

Preferably, herein the number of the titanium alloy spokes, the number of the second assembly holes, the number of the first mounting holes, the number of the second mounting holes, and the total number of the threaded holes in the two layers of ring grooves is all equal. In the embodiment, the number of the titanium alloy spokes, the number of second assembly holes, the number of first mounting holes, the number of the second mounting holes, and the number of threaded holes can be designed as needed, and in the present embodiment, the equal number design is adopted to ensure that the overall shape of the wheel is beautiful and the structure is uniform.

In some embodiments, herein an upper end of the connecting ring is provided with an annular boss on outside of the upper end, the annular boss is provided with a plurality of second mounting holes and is passed through by the second mounting holes vertically, and a lower end of the connecting ring is uniformly provided with a plurality of first mounting holes and is passed through by the first mounting holes horizontally. In the present embodiment, the structure of the connecting ring is specially designed, making it easier to connect the rim with the spokes, and the wheel has the characteristics of simple structure, convenient assembly, high safety and reliability and stable performance.

In some embodiments, herein the first mounting holes each have a small inside diameter and a large outside diameter, the steel sleeves are adapted to the first mounting holes in shape, the steel sleeves each have a small inside diameter and a large outside diameter, and the first inner hole of the outer side of each of the steel sleeves is provided with a spherical surface. In the present embodiment, according to the mounting requirements of the steel sleeves, matching structures of the steel sleeves and the first mounting holes are designed, so that the assembly is convenient, safe and reliable, and the performance is stable.

Preferably, herein the positions of the first mounting holes are in one-to-one correspondence to the positions of the second mounting holes in the vertical direction. In the present embodiment, the structural correspondence is adopted, and the positions of the connecting bolts correspond to the positions of the spokes, so that the overall shape of the wheel looks more beautiful.

Preferably, herein the positions of the threaded holes in the upper layer of ring groove are in one-to-one correspondence to the positions of the threaded holes in the lower layer of ring groove in the vertical direction. In the present embodiment, a structure in which one ends of two titanium alloy spokes are fixed with one above the other is adopted, and the structural strength of the wheel and the safety, reliability and performance stability of the wheel are ensured by means of the stability of a triangle.

In a third aspect, the disclosure claims to protect an automobile using the lightweight wheel according to any one of the above embodiments. By adopting the aforementioned lightweight wheels, the service life of a tire is prolonged, and the running safety of the automobile is effectively guaranteed; meanwhile, the weight of the wheel is further reduced, so that under the same power, the braking performance of the wheel is more sensitive compared with that of a pure aluminum alloy hub, the damping effect is better, and the oil consumption is lower.

Compared with the related art, the disclosure has the following beneficial effects:

The disclosure provides lightweight wheels and an automobile. The plurality of titanium alloy spokes are adopted to connect and fix the flange and the carbon fiber rim, and the titanium alloy spokes ensure the structural strength of the wheel; meanwhile, the weight of the wheel is reduced, the heat dissipation effect is good, the service life of the tire is prolonged, and the running safety of the automobile is effectively guaranteed; the carbon fiber rim ensures the structural strength of the wheel and further reduces the weight of the wheel, so that under the same power, the braking performance of the wheel is more sensitive compared with that of a pure aluminum alloy hub, the damping effect is better, and the oil consumption is lower; a connecting structure of the locking sleeves, the steel sleeves and the connecting ring is specifically designed, so that the assembly difficulty and processing cost of the titanium alloy spokes are effectively reduced, and the spatial layout of the titanium alloy spokes can be realized, thus meeting the requirements on strength, appearance and the like of the wheel; besides, the design of the connecting parts and the structure effectively reduces the overall weight of the wheel, ensures the structural strength and heat dissipation performance of the wheel, meets the requirement for light weight of the wheel, and has the characteristics of simple structure, convenient assembly, high safety and reliability and stable performance. In addition, the lightweight wheel adopts a split design, which allows damaged parts to be replaced separately, thus greatly reducing the maintenance and replacement costs and being more beneficial to the promotion of the wheel.

BRIEF DESCRIPTION OF THE DRAWINGS

In order to more clearly explain the technical solution in the embodiments of the present disclosure, drawings which require to be used in description of the embodiments are simply introduced below, obviously, the drawings in description below are some embodiments of the present

LIST OF REFERENCE SYMBOLS

1—flange, 2—titanium alloy spoke, 3—locking sleeve, 4—steel sleeve, 5—connecting ring, 6—connecting bolt, 7—carbon fiber rim, 3-1—ring groove, 3-2—threaded hole, 4-1—spherical surface of inner hole of steel sleeve, 4-2—inner hole of steel sleeve, 5-1—structural surface of locking sleeve, 5-2—inner hole of locking sleeve, 5-3—spherical surface of locking sleeve, 6-1—flat end, 6-2—thread, 8-1—first mounting hole, 8-2—second mounting hole, 1-1—the side wall of the flange, 5-4—the side wall of the connecting ring, 5-5—the upper end face of the connecting ring, 5-6—the upper side wall of the locking sleeve, 6-3—the first assembly hole, 7-1—the ring-shaped boss, 7-2—the second assembly hole, 8-3—the radially inner diameter of the first mounting hole and 8-4—the radially outer diameter of the first mounting hole.

DETAILED DESCRIPTION OF THE EMBODIMENTS

The technical solution in the embodiments of the present disclosure is clearly and completely described in combination with drawings of the embodiments of the present disclosure below, and obviously, the described embodiments are a part of embodiments of the present disclosure rather than all embodiments. Based on the embodiments of the present disclosure, all the other embodiments obtained by those having ordinary skill in the art without any creative works are within the protection scope of the present disclosure.

The terms "first", "second", "third", "fourth" and the like in the specification and in the claims of the present disclosure are used for distinguishing different objects but not for describing a specific sequence. Furthermore, the terms "include" and "have" as well as their any variations are intended to cover a non-exclusive inclusion. For example, a process, method, system, product or equipment including a series of steps or units does not limit steps or units which have been listed, but selectively further includes steps or units which are not listed, or selectively further includes other inherent steps or units for the process, method, product or equipment.

Reference in the specification to "embodiments" of the present disclosure means that a particular feature, structure or characteristic described in connection with the embodiments is included in at least one embodiment of the present disclosure. The appearances of the phrase "the embodiments" in various places in the specification are not necessarily all referring to the same embodiment, nor are separate or alternative embodiments necessarily mutually exclusive of other embodiments. It will be explicitly and implicitly understood by those skilled in the art that the embodiments described in the present disclosure can be combined to other embodiments.

In order to further understand the content, features and functions of the disclosure, the following embodiments are given and illustrated with the attached drawings as follows.

First Embodiment

Figure 1:
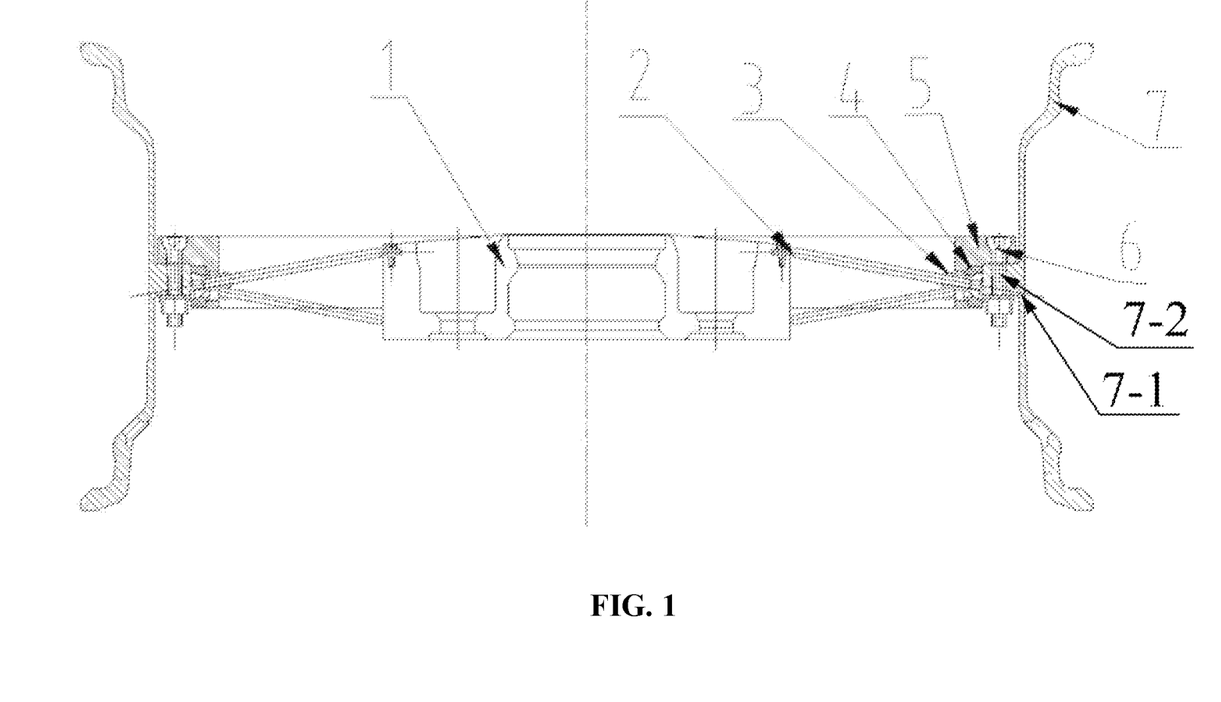
FIG. 1 is a structural schematic diagram of a lightweight wheel of the present disclosure.
Figure 2:
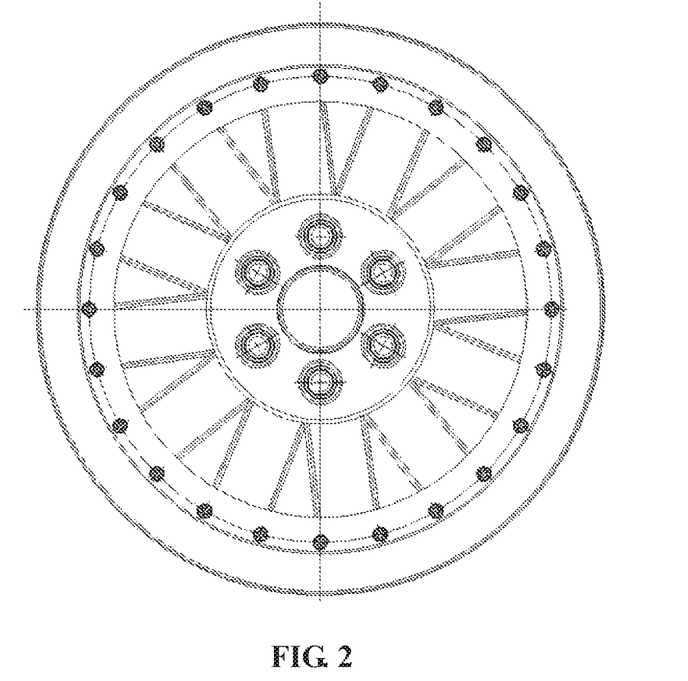
FIG. 2 is a top view of a lightweight wheel of the present disclosure.

First Embodiment of the present disclosure will be described below in conjunction with accompanying FIGS. 1-8 of the description:

A lightweight wheel includes a flange 1, a plurality of titanium alloy spokes 2, locking sleeves 3, steel sleeves 4, a connecting ring 5, connecting bolts 6 and a carbon fiber rim 7. The flange 1 is positioned at an inner middle part of the carbon fiber rim 7, the plurality of titanium alloy spokes 2 are connected between the flange 1 and the carbon fiber rim 7, and the plurality of titanium alloy spokes 2 are uniformly distributed in pairs along the circumference; and an end of each of the titanium alloy spokes 2 combined in pairs is fixed on the flange 1 in a centralized mode, and another end is fixed separately at the carbon fiber rim 7, making the titanium alloy spokes combined in pairs a fan shape. The carbon fiber rim 7 and the titanium alloy spokes 2 in the wheel are formed in such a way as to effectively reduce the overall weight of the wheel.

Figure 3:
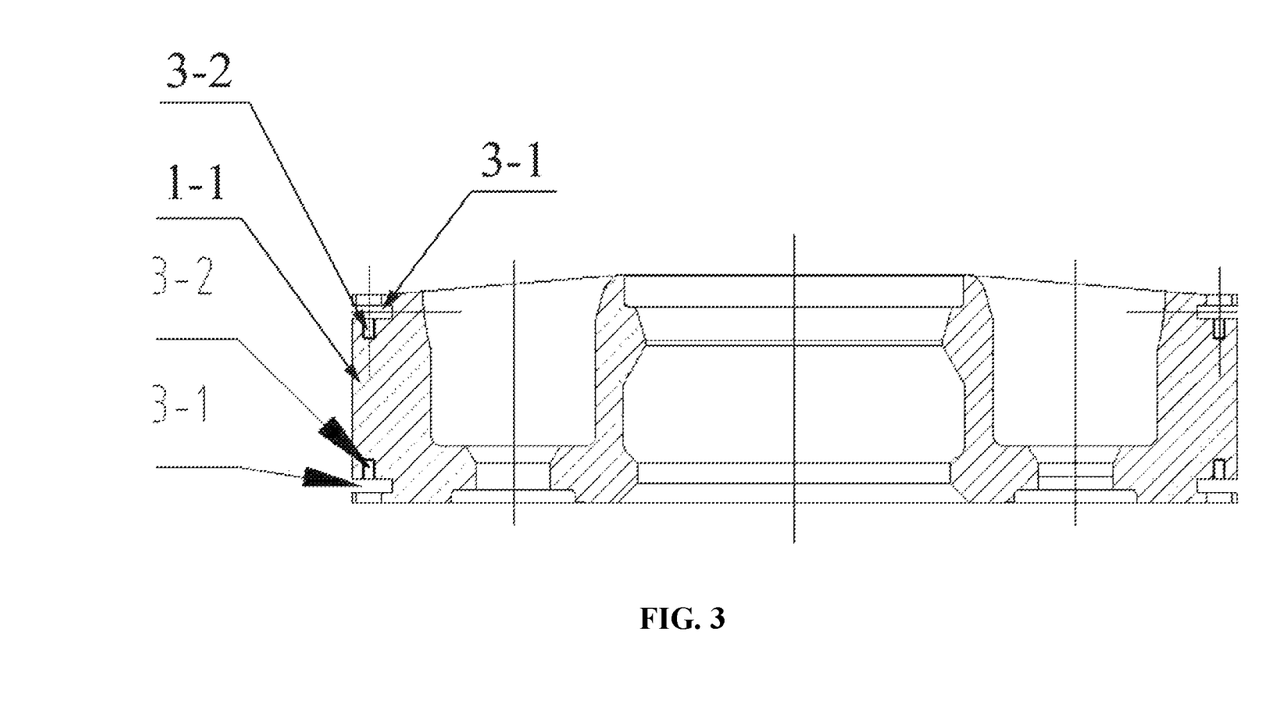
FIG. 3 is a structural schematic diagram of a flange of a lightweight wheel of the present disclosure.
Figure 4:
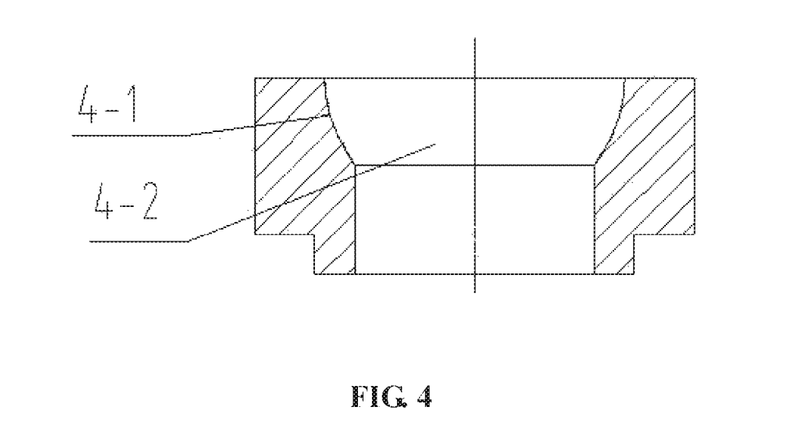
FIG. 4 is a structural schematic diagram of a steel sleeve of a lightweight wheel of the present disclosure.
Figure 5:
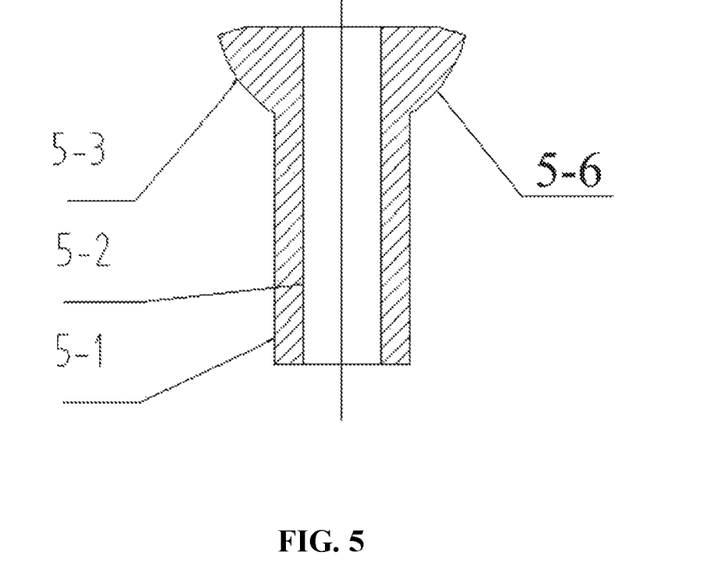
FIG. 5 is a structural schematic diagram of a locking sleeve of a lightweight wheel of the present disclosure.
Figure 6:
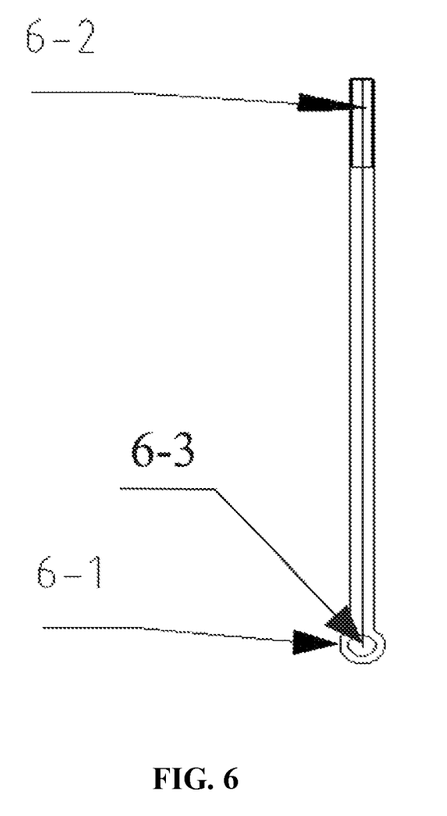
FIG. 6 is a first structural schematic diagram of a titanium alloy spoke of a lightweight wheel of the present disclosure.
Figure 7:
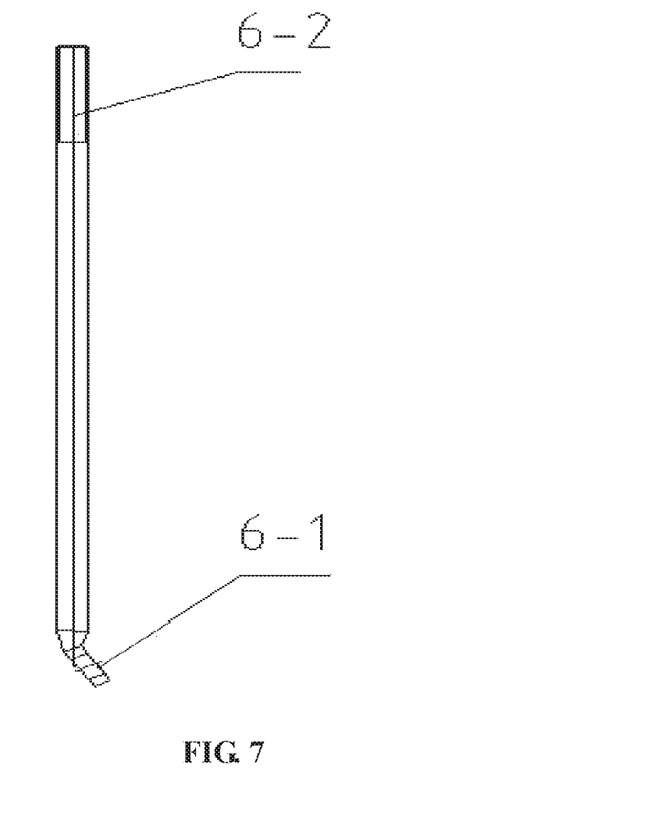
FIG. 7 is a second structural schematic diagram of a titanium alloy spoke of a lightweight wheel of the present disclosure.

As shown in FIGS. 6-7, an end of each titanium alloy spoke 2 is provided with threads 6-2, another end is bent and provided with a flat end 6-1, and each flat end 6-1 is provided with a first assembly hole 6-3. The side wall 1-1 of the flange 1 is provided with two layers of ring grooves 3-1 with one above the other, each layer of ring groove 3-1 is provided with a plurality of threaded holes 3-2 uniformly distributed, an end of each of the first assembly holes of the titanium alloy spoke 2 is mounted on a ring groove 3-1 through bolt fastened in the threaded hole 3-2 of the ring groove 3-1, the bolt is fastened in the threaded hole 3-2 of the ring groove 3-1 and pass through the first assembly hole to mount the flat end 6-1 of the titanium alloy spoke 2 on the ring groove 3-1, and the positions of the threaded holes in the upper layer of ring groove are in one-to-one correspondence to the positions of the threaded holes in the lower layer of ring groove in the vertical direction. Due to the fact that the flange 1 and the titanium alloy spokes 2 are connected through the ring grooves 3-1, the titanium alloy spokes 2 have the freedom of movement in the circumferential direction of the ring grooves 3-1, thus effectively reducing the assembly difficulty and processing cost of the titanium alloy spokes 2.

Figure 8:
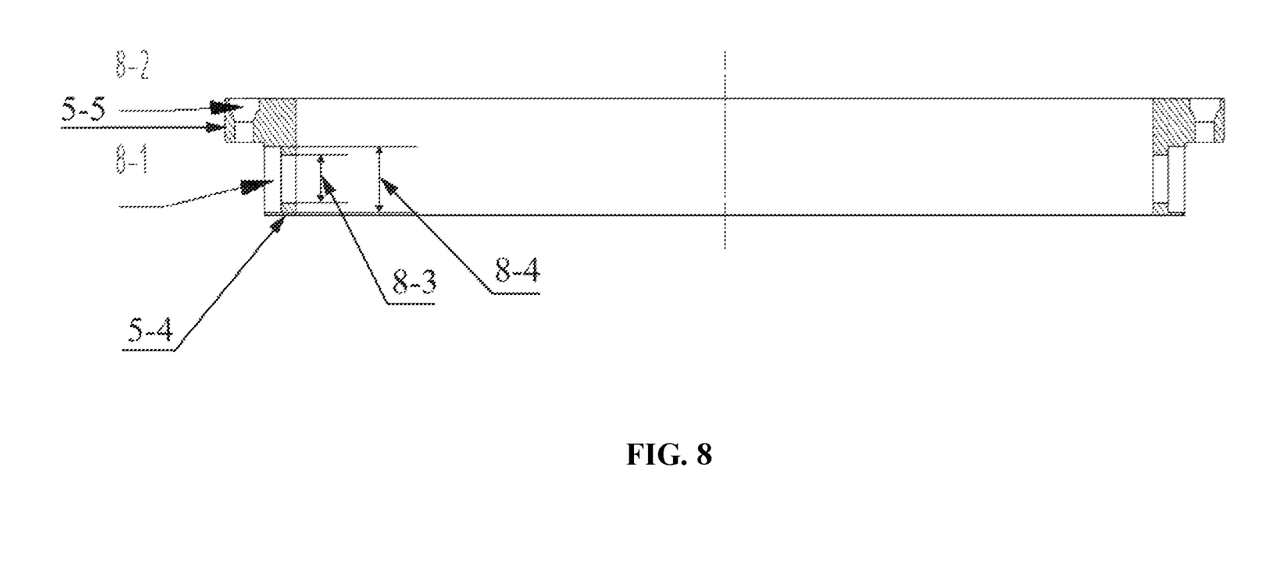
FIG. 8 is a structural schematic diagram of a connecting ring of a lightweight wheel of the present disclosure.

The inner side of the middle part of the carbon fiber rim 7 is provided with a ring-shaped boss 7-1, and a plurality of second assembly holes 7-2 are uniformly distributed in the ring-shaped boss. As shown in FIG. 8, the outer side of the upper end of the connecting ring 5 is provided with an annular boss, a plurality of second mounting holes 8-2 are uniformly formed in the annular boss, and perforated by the annular boss vertically, and the lower end of the connecting ring 5 is uniformly provided with a plurality of first mounting holes 8-1 and perforated by the first mounting holes horizontally. The side wall 5-4 and the upper end face 5-5 of the connecting ring 5 are respectively provided with a plurality of first mounting holes 8-1 and a plurality of second mounting holes 8-2 which are uniformly distributed, the steel sleeves 4 are mounted in the first mounting holes 8-1, a plurality of first inner holes are formed in the steel sleeves 4, and the first inner holes on an outer side of each of the steel sleeves are spherical surfaces, for details, see the spherical surface of first inner hole of steel sleeve (4-1) and the first inner hole of steel sleeve (4-2) in FIG. 4. The first mounting holes 8-1 each have a small inside diameter 8-3 and a large outside diameter 8-4, the steel sleeves 4 are adapted to the first mounting holes 8-1 in shape, the steel sleeves 4 each have a small inside diameter and a large outside diameter, and the first inner holes on the outer side of each of the steel sleeves 4 is provided with a spherical surface. The connecting bolts 6 pass through the second mounting holes 8-2 and the second assembly holes and are matched with to fix the carbon fiber rim 7 and the connecting ring 5. The number of the titanium alloy spokes 2, the number of the second assembly holes, the number of the first mounting holes 8-1, the number of the second mounting holes 8-2, and the total number of the threaded holes 3-2 in the two layers of ring grooves is all equal. The positions of the first mounting holes 8-1 are in one-to-one correspondence to the positions of the second mounting holes 8-2 in the vertical direction.

Each locking sleeve 3 includes a spherical surface at the upper end and a structural surface at the lower end, a plurality of second inner holes are formed in the locking sleeves 3 in a vertically through manner, the upper side wall 5-6 of each of the locking sleeves 3 is provided with a spherical surface, and the upper side wall of each of the locking sleeves 3 is mounted in the first inner holes of the steel sleeves 4 and is matched with the spherical surface of the first inner hole of each of the steel sleeves 4. For details of the second inner hole formed in each locking sleeve 3, see the structure of a locking sleeve 3 in FIG. 5, herein reference sign 5-1 denotes the structural surface of the locking sleeve, 5-2 denotes the second inner hole of the locking sleeve, and 5-3 denotes the spherical surface of the locking sleeve. The second inner hole of each locking sleeve 3 is a threaded hole, the second inner hole of each locking sleeve 3 is matched with the threads at one end of the corresponding titanium alloy spoke 2 to fix an end of the titanium alloy spoke 2 to the second inner hole of the locking sleeve 3, and the tightness of the titanium alloy spoke 2 can be adjusted by matching a special tool for tightening with the structural surface of the locking sleeve 3 and rotating the locking sleeve 3. By means of the matching of the spherical surface of the first inner hole of each of the steel sleeves 4 and the spherical surface of the upper side wall of each of the locking sleeves 3, the locking sleeves 3 and the titanium alloy spokes 2 can rotate around the spherical centers of the steel sleeves 4 within a certain range, and the structure can realize the spatial layout of the titanium alloy spokes 2, thereby meeting the requirements on strength, appearance and the like of wheels.

In actual use, a series of titanium alloy spokes 2 are mounted on the ring grooves 3-1 in the flange through the bolts fastened in the threaded holes 3-2 in the ring grooves 3-1. Then, the steel sleeves 4 are uniformly pressed into the mounting holes in the side wall 5-4 of the connecting ring 5. Then, a series of locking sleeves 3 are enabled to pass through the steel sleeves 4, the spherical surfaces of the first inner holes of the steel sleeves 4 are matched with the spherical surface of the upper side walls of the locking sleeves 3, at the same time, threads on the second inner holes of the locking sleeves 3 are meshed with the threaded ends of the titanium alloy spokes 2, the locking sleeves 3 are sequentially rotated by a special tool to adjust the tightness of the titanium alloy spokes, and the requirement on the coaxiality of the center of the flange and the connecting ring 5 is met. Finally, the assembled connecting ring 5 is mounted on the carbon fiber rim 7 through the matching of the specific connecting bolts 6 and nuts. In this way, the titanium alloy spoke and carbon fiber rim lightweight wheel is obtained.

Second Embodiment

An automobile adopts the lightweight wheel in First Embodiment. By adopting the aforementioned lightweight wheel, the service life of a tire is prolonged, and the running safety of the automobile is effectively guaranteed; meanwhile, the weight of the wheel is further reduced, so that under the same power, the braking performance of the wheel is more sensitive compared with that of a pure aluminum alloy hub, the damping effect is better, and the oil consumption is lower.

The disclosure provides lightweight wheels and an automobile. The plurality of titanium alloy spokes are adopted to connect and fix the flange and the carbon fiber rim, and the titanium alloy spokes ensure the structural strength of the wheel; meanwhile, the weight of the wheel is reduced, the heat dissipation effect is good, the service life of the tire is prolonged, and the running safety of the automobile is effectively guaranteed; the carbon fiber rim ensures the structural strength of the wheel and further reduces the weight of the wheel, so that under the same power, the braking performance of the wheel is more sensitive compared with that of a pure aluminum alloy hub, the damping effect is better, and the oil consumption is lower; a connecting structure of the locking sleeves, steel sleeves and the connecting ring is specifically designed, so that the assembly difficulty and processing cost of the titanium alloy spokes are effectively reduced, and the spatial layout of the titanium alloy spokes can be realized, thus meeting the requirements on strength, appearance and the like of the wheel; besides, the design of the connecting parts and the structure effectively reduces the overall weight of the wheel, ensures the structural strength and heat dissipation performance of the wheel, meets the requirement for light weight of the wheel, and has the characteristics of simple structure, convenient assembly, high safety and reliability and stable performance. In addition, the lightweight wheel adopts a split design, which allows damaged parts to be replaced separately, thus greatly reducing the maintenance and replacement costs and being more beneficial to the promotion of the wheel. The automobile adopting the lightweight wheel can have a longer service life of the tire, thus effectively ensuring the running safety of the automobile; meanwhile, the weight of the wheel is further reduced, so that under the same power, the braking performance of the wheel is more sensitive compared with that of a pure aluminum alloy hub, the damping effect is better, and the oil consumption is lower.

The embodiments of the present disclosure are described in detail above, particular examples are used herein to explain the principle and embodiments of the present disclosure, and the above description of the embodiments is only used for helping understanding the methods and core concept of the present disclosure; and meanwhile, for those having ordinary skill in the art, according to the idea of the present disclosure, there will be changes in the specific implementation mode and present disclosure scope, in conclusion, the contents of the specification shall not be construed as a limitation of the present disclosure.

The invention claimed is:

1. A lightweight wheel, comprising a flange, a plurality of titanium alloy spokes, locking sleeves, steel sleeves, a connecting ring, connecting bolts and a carbon fiber rim, wherein an end of each of the plurality of titanium alloy spokes is provided with threads, another end of each of the plurality of titanium alloy spokes is bent and provided with a flat end, and each flat end is provided with a first assembly hole; the flange is positioned at a middle part of the carbon fiber rim, a side wall of the flange is provided with two ring grooves which are axially opposite with each other, each of the two ring grooves is provided with a plurality of threaded holes uniformly distributed; a plurality of bolts are fastened in the plurality of threaded holes of each ring groove of the two ring grooves and pass through the first assembly holes to mount the flat ends of the plurality of titanium alloy spokes on each of the two ring grooves; a radially inner side of the middle part of the carbon fiber rim is provided with a ring-shaped boss, and a plurality of second assembly holes are uniformly distributed in the ring-shaped boss; a side wall and an upper end face of the connecting ring are respectively provided with a plurality of first mounting holes and a plurality of second mounting holes which are uniformly distributed, each of the steel sleeves is mounted in each of the plurality of first mounting holes, a first inner hole is formed in each of the steel sleeves, and the first inner hole of each of the steel sleeves is provided with a spherical surface; the connecting bolts pass through the plurality of second mounting holes and the plurality of second assembly holes to fix the carbon fiber rim and the connecting ring; an upper side wall of each of the locking sleeves is provided with a spherical surface, the upper side wall of each of the locking sleeves is mounted in the first inner hole of each of the steel sleeves and is matched with the spherical surface of the first inner hole of each of the steel sleeves, and a second inner hole is formed in each of the locking sleeves; and the second inner hole of each of the locking sleeves is a threaded hole, and the second inner hole of each of the locking sleeves is matched with the threads at the end of each of the plurality of titanium alloy spokes to fix the end of each of the plurality of titanium alloy spokes to each of the second inner holes of the locking sleeves.

2. The lightweight wheel according to claim 1, wherein each of the locking sleeves comprises the spherical surface at an upper end and a structural surface at a lower end, the second inner hole is formed in each of the locking sleeves in a vertically through manner, and tightness of each of the plurality of titanium alloy spokes is adjustable by matching a special tool for tightening with the structural surface of one locking sleeve of the locking sleeves and rotating the one locking sleeve.

3. The lightweight wheel according to claim 1, wherein the number of the plurality of titanium alloy spokes, the number of the plurality of second assembly holes, the number of the plurality of first mounting holes, the number of the plurality of second mounting holes, and the total number of the plurality of threaded holes in the two ring grooves are all equal.

4. The lightweight wheel according to claim 1, wherein a radially outer end of the connecting ring is provided with an annular boss, the annular boss is provided with the plurality of second mounting holes and is perforated by the plurality of second mounting holes axially, and a radially inner end of the connecting ring is uniformly provided with the plurality of first mounting holes and is perforated by the plurality of first mounting holes horizontally.

5. The lightweight wheel according to claim 4, wherein the plurality of first mounting holes each have a small radially inner diameter and a large radially outer diameter, the steel sleeves are adapted to the plurality of first mounting holes in shape, each of the steel sleeves has a small radially inner diameter and a large radially outer diameter, and the first inner hole of an outer side of each of the steel sleeves is provided with a spherical surface.

6. The lightweight wheel according to claim 1, wherein positions of the plurality of threaded holes in the two ring grooves are in one-to-one correspondence to each other in an axial direction.

7. The lightweight wheel according to claim 1, wherein the plurality of titanium alloy spokes are connected between the flange and the carbon fiber rim, the plurality of titanium alloy spokes are uniformly distributed in pairs along a circumference of the lightweight wheel, the flat end of each of the titanium alloy spokes combined in pairs is fixed on the flange in a centralized mode, and the end provided with the threads of each of the titanium alloy spokes is fixed separately at the carbon fiber rim, making the titanium alloy spokes combined in pairs have a fan shape.

8. An automobile, comprising a lightweight wheel, the lightweight wheel comprises a flange, a plurality of titanium alloy spokes, locking sleeves, steel sleeves, a connecting ring, connecting bolts and a carbon fiber rim, wherein an end of each of the plurality of titanium alloy spokes is provided with threads, another end of each of the plurality of titanium alloy spokes is bent and provided with a flat end, and each flat end is provided with a first assembly hole; the flange is positioned at a middle part of the carbon fiber rim, a side wall of the flange is provided with two ring grooves which are axially opposite with each other, each of the two ring grooves is provided with a plurality of threaded holes uniformly distributed; a plurality of bolts are fastened in the plurality of threaded holes of each ring groove of the two ring grooves and pass through the first assembly holes to mount the flat ends of the plurality of titanium alloy spokes on each of the two ring grooves; a radially inner side of the middle part of the carbon fiber rim is provided with a ring-shaped boss, and a plurality of second assembly holes are uniformly distributed in the ring-shaped boss; a side wall and an upper end face of the connecting ring are respectively provided with a plurality of first mounting holes and a plurality of second mounting holes which are uniformly distributed, each of the steel sleeves is mounted in each of plurality of the first mounting holes, a first inner hole is formed in each of the steel sleeves, and the first inner hole of each of the steel sleeves is provided with a spherical surface; the connecting bolts pass through the plurality of second mounting holes and the plurality of second assembly holes to fix the carbon fiber rim and the connecting ring; an upper side wall of each of the locking sleeves is provided with a spherical surface, the upper side wall of each of the locking sleeves is mounted in the first inner hole of each of the steel sleeves and is matched with the spherical surface of the first inner hole of each of the steel sleeves, and a second inner hole is formed in each of the locking sleeves; and the second inner hole of each of the locking sleeves is a threaded hole, and the second inner hole of each of the locking sleeves is matched with the threads at the end of each of the plurality of titanium alloy spokes to fix the end of each of the plurality of titanium alloy spokes to each of the second inner holes of the locking sleeves.

* * * * *